(12) United States Patent
Raayman

(10) Patent No.: US 11,635,970 B2
(45) Date of Patent: Apr. 25, 2023

(54) INTEGRATED NETWORK BOOT OPERATING SYSTEM INSTALLATION LEVERAGING HYPERCONVERGED STORAGE

(71) Applicant: NUTANIX, INC., San Jose, CA (US)

(72) Inventor: Sebastiaan Gerhardus Johannes Raayman, Sinsheim (DE)

(73) Assignee: Nutanix, Inc., San Jose, CA (US)

( * ) Notice: Subject to any disclaimer, the term of this patent is extended or adjusted under 35 U.S.C. 154(b) by 354 days.

(21) Appl. No.: 16/942,500

(22) Filed: Jul. 29, 2020

(65) Prior Publication Data
US 2021/0326150 A1    Oct. 21, 2021

Related U.S. Application Data

(60) Provisional application No. 63/011,777, filed on Apr. 17, 2020.

(51) Int. Cl.
*G06F 9/4401* (2018.01)
*G06F 9/455* (2018.01)
(Continued)

(52) U.S. Cl.
CPC ........ *G06F 9/4416* (2013.01); *G06F 9/45558* (2013.01); *H04L 12/4641* (2013.01); *H04L 45/42* (2013.01); *H04L 45/586* (2013.01); *H04L 61/5014* (2022.05); *G06F 15/177* (2013.01); *G06F 2009/45562* (2013.01); *G06F 2009/45575* (2013.01); *G06F 2009/45595* (2013.01)

(58) Field of Classification Search
CPC ......... G06F 15/177; G06F 2009/45562; G06F 2009/45575; G06F 2009/45595; G06F 9/4416; G06F 9/45558; H04L 12/4641; H04L 45/42; H04L 45/586; H04L 61/5014
See application file for complete search history.

(56) References Cited

U.S. PATENT DOCUMENTS 7,979,260 B1    7/2011   Sobel et al.
8,549,518 B1   10/2013   Aron et al.
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Terrell S Johnson
(74) *Attorney, Agent, or Firm* — Stoel Rives LLP

(57) ABSTRACT

A computing node is configure to implement an intra-node network boot and installation protocol (protocol) for booting and installing an operating system (OS) on a virtual machine hosted on the computing node without communicating over a physical network. The protocol includes hosting a dynamic host configuration protocol (DHCP) server instance and/or a network boot server instance on a controller virtual machine of the computing node to emulate DHCP protocol and network boot server protocol communications. In some examples, the protocol further utilizes one or more virtual extensible local area networks (LANs)(VXLANs) and a virtual switch hosted at a hypervisor running on the computing node.

23 Claims, 5 Drawing Sheets

(51) Int. Cl.
    *H04L 12/46*     (2006.01)
    *H04L 45/42*     (2022.01)
    *H04L 45/586*     (2022.01)
    *H04L 61/5014*     (2022.01)
    *G06F 15/177*     (2006.01)

(56) References Cited

U.S. PATENT DOCUMENTS

| | | |
|---|---|---|
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,336,132 B1 | 5/2016 | Aron et al. |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |
| 2012/0331461 A1 | 12/2012 | Fries et al. |
| 2013/0266015 A1 | 10/2013 | Qu et al. |
| 2014/0098815 A1 | 4/2014 | Mishra et al. |
| 2014/0115578 A1 | 4/2014 | Cooper et al. |
| 2017/0279690 A1* | 9/2017 | Tripathi ................ H04L 45/66 |
| 2017/0308503 A1* | 10/2017 | Somohano ............. H04L 45/02 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bibie/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org: first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

* cited by examiner

INTEGRATED NETWORK BOOT OPERATING SYSTEM INSTALLATION LEVERAGING HYPERCONVERGED STORAGE

CROSS REFERENCE TO RELATED APPLICATIONS

This application claims priority to Provisional Application No. 63/011,777 filed Apr. 17, 2020, titled "INTEGRATED NETWORK BOOT OPERATING SYSTEM INSTALLATION LEVERAGING HYPERCONVERVED STORAGE"; the contents of which are incorporated herein by reference, in their entirety for any purpose.

BACKGROUND

Computer boot processes generally involve the use of one of two different methods. A first method includes reading boot images from a local drive attached to the computer, such as a compact disc (CD) drive (e.g., by reading a CD containing the boot images), a digital video disk (DVD) drive (e.g., by reading a DVD containing the boot images, another type of optical disc drive e.g., by reading a compatible optical disk containing the boot images), a flash drive, a hard disk drive, or some other physical disk drive attached to the computer. A second method includes a network boot, where the computer is initialized to enable a network connection, and the boot images are transferred over a network to the computer. The first method is not dependent on any external infrastructure to operate (e.g., such as a physical network connection and availability of a server hosting the boot image), but boot image updates in large scale system can become difficult to manage, as they require generating and physically deploying new media with the updated boot images. The second method stores the boot images at a central repository, which makes updates easier to roll out in large scale operations. However, the second method is dependent on external infrastructure to operate, including a physical network connection and availability of the server hosting the boot image.

DESCRIPTION

Figure 1:
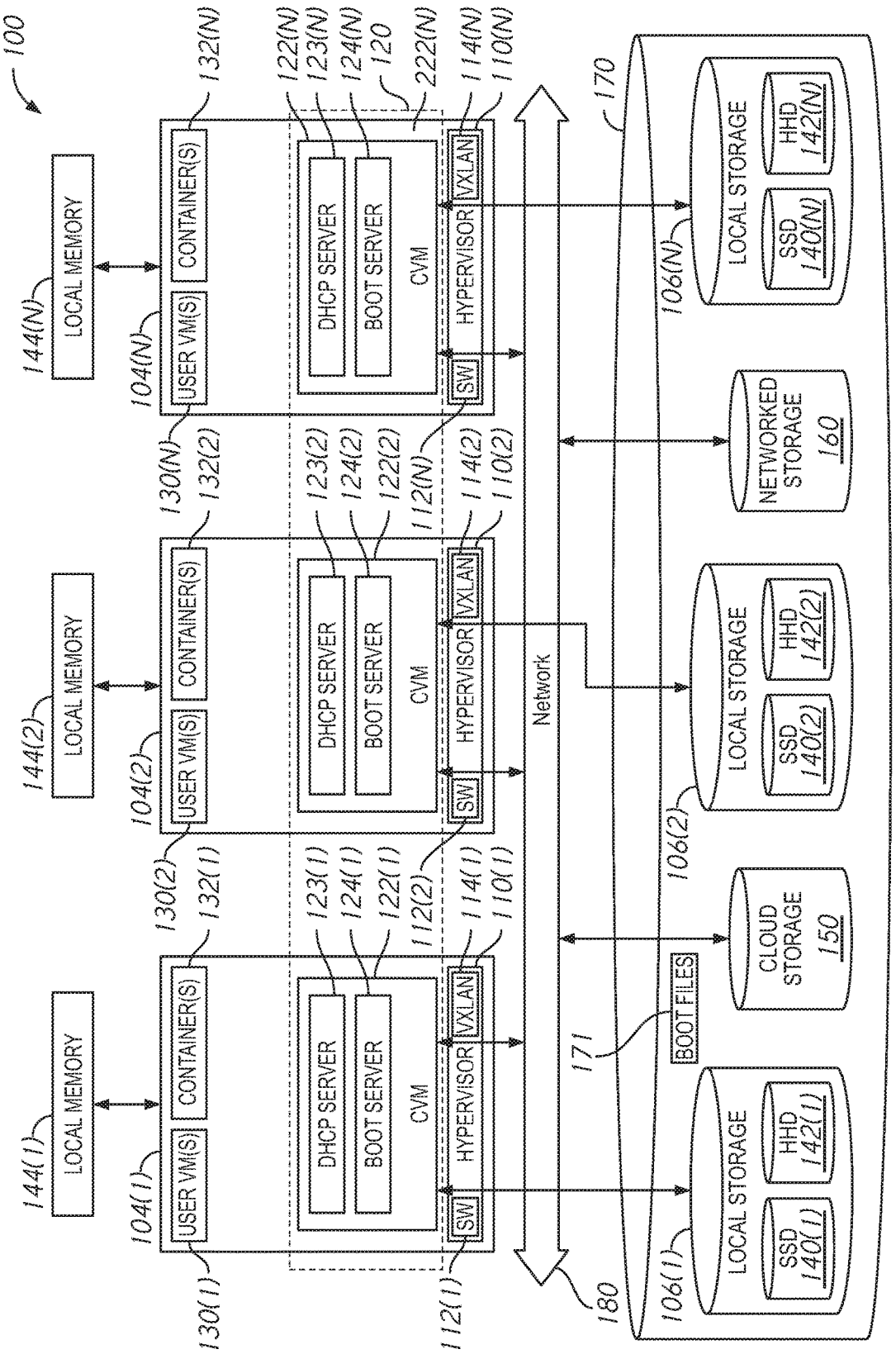
FIG. 1 is a block diagram of a distributed computing system, in accordance with an embodiment of the present disclosure.

This application describes methods to facilitate an integrated (e.g., intra-cluster or intra-server) network boot and installation protocol for booting and installing an operating system (OS) on a virtual machine. The method leverages network boot and installation protocols (e.g., trivial file transfer protocol (TFTP) and/or preboot execution environment (PXE) server boot protocols) to boot and install an operating system on a virtual machine (VM) hosted on a host machine (e.g., computing node) of a cluster of host machines without communicating over a physical network. The method may include hosting a dynamic host configuration protocol (DHCP) server instance and a network boot server instance on a controller VM of the host machine to emulate DHCP protocol and network boot server protocol communications facilitate an OS installation. The network boot server instance may be configured to perform a network boot and direct the VM to access installation files hosted in a storage container of the cluster of host machines. In addition, one or more virtual extensible local area networks (LANs) (VXLANs) and a virtual switch may be hosted at a hypervisor running on the host machine.

The virtual switch may receive broadcast DHCP messages from a virtual network interface card (vNIC) of the VM requesting network information (e.g., internet protocol (IP) address, network boot server information, etc.). The virtual switch may be configured with one or more OpenFlow rules that define routing criteria for certain network package types. In an example, the virtual switch may be configured with OpenFlow rules (e.g., packet matching rules) to route DHCP communication packets and network boot packet types over respective VXLANs. The OpenFlow rules may direct the virtual switch to route the DHCP communication packets to a first port associated with a first VXLAN and to route the network boot packet types to a second port associated with a second VXLAN. Thus, in response to receipt of the DHCP broadcast request, the virtual switch may route the DHCP broadcast message to a port based on the predetermined OpenFlow rule corresponding to DHCP broadcast messages. In some examples, the virtual switch or the vNIC may be configured with a VM vNIC flag that directs the virtual switch to re-direct communications from the user VM to the DHCP server instance or to the network boot server instance hosted on the controller VM, or to route requests over the physical network. Based on the routing rules, the virtual switch may direct the request to the DHCP server instances via a VXLAN, rather than directing the request to an external DHCP server over the physical network. The DHCP server instance may communicate with the VM via the VXLAN to provide the network information. In some examples, the virtual switch or the vNIC may be configured with a VM vNIC flag that points to a network installation server and file.

In response to receipt of the network information, the VM (using the vNIC) may transmit a network boot request to a network boot server. The network boot protocol may include a TFTP or a PXE boot protocol. The virtual switch may direct the request to the network boot server instance via a second VXLAN based on the VM vNIC flag. In response to the request, the network boot server may communicate with the VM to facilitate a network boot operation. After the network boot is complete, the network boot server may direct the VM to the respective installation files/images (e.g., including an operating system) associated with the VM based on information provided with the request. The installation files may include ISO files, or a server message block (SMB) or network file server (NFS) container whitelist to allow a network installation. The installation files/images may be stored on the installation server service directory in a storage container. In communication with the VM, the network boot server instance may be configured to provide the installation files/images to the VM via the second VXLAN.

Performing the network installation using virtual networks and server instances hosting locally may mitigate dependence on a physical network, while retaining the benefits of centrally maintaining installation files. That is, the network boot protocol may allow installation files to be loaded to a VM in a highly available and automated way by bypassing dependency on components external to the cluster of host machines and ensuring traffic stays local to the host by means of IP address management (IPAM), OpenFlow, and VXLAN architectures. The local communication solution may remove the dependency on external servers by the redirection of appropriate traffic types and gain performance because installation traffic is contained to a local host machine and is read only in nature. Use of the IPAM may prevent conflict with physically present DHCP/PXE server on the network. In addition, an ability to manage network installation using centralized storage may facilitate automated installations of many different operating systems.

FIG. 1 is a block diagram of a distributed computing system 100, in accordance with an embodiment of the present disclosure. The distributed computing system 100 generally includes computing nodes (e.g., host machines, servers, computers, nodes, etc.) 104(1)-(N) and storage 170 connected to a network 180. While FIG. 1 depicts three computing nodes, the distributed computing system 100 may include one, two or more than three computing nodes without departing from the scope of the disclosure. The network 180 may be any type of network capable of routing data transmissions from one network device (e.g., computing nodes 104(1)-(N) and the storage 170) to another. For example, the network 180 may be a local area network (LAN), wide area network (WAN), intranet, Internet, or any combination thereof. The network 180 may be a wired network, a wireless network, or a combination thereof. In some examples, the computing nodes 104(1)-(N) may each include memories configured to store instructions that cause one or more processor units to perform operations or methods described herein when executed, and may include one or more processor units configured to execute the instructions.

The storage 170 may include respective local storage 106(1)-(N), cloud storage 150, and networked storage 160. Each of the respective local storage 106(1)-(N) may include one or more persistent memory module devices (PMem), non-volatile memory extension (NVMe) devices, solid state drive (SSD) devices 140(1)-(N) and one or more hard disk drives (HDD)) devices 142(1)-(N). Each of the respective local storage 106(1)-(N) may be directly coupled to, included in, and/or accessible by a respective one of the computing nodes 104(1)-(N) without communicating via the network 180. The cloud storage 150 may include one or more storage servers that may be stored remotely to the computing nodes 104(1)-(N) and may be accessed via the network 180. The cloud storage 150 may generally include any type of storage device, such as HDDs, SSDs, optical drives, etc. The networked storage (or network-accessed storage) 160 may include one or more storage devices coupled to and accessed via the network 180. The networked storage 160 may generally include any type of storage device, such as PMem, NVMe, HDDs, SSDs, optical drives, etc. In various embodiments, the networked storage 160 may be a storage area network (SAN).

Each of the computing nodes 104(1)-(N) may include a computing device configured to host a respective hypervisor 110(1)-(N), a respective controller virtual machine (CVM) 122(1)-(N), respective user (or guest) virtual machines (VMs) 130(1)-(N), and respective containers 132(1)-(N). For example, each of the computing nodes 104(1)-(N) may be or include a server computer, a laptop computer, a desktop computer, a tablet computer, a smart phone, any other type of computing device, or any combination thereof. Each of the computing nodes 104(1)-(N) may include one or more physical computing components, such as one or more processor units, respective local memory 144(1)-(N) (e.g., cache memory, dynamic random-access memory (DRAM), non-volatile memory (e.g., flash memory), or combinations thereof), the respective local storage 106(1)-(N), ports (not shown) to connect to peripheral input/output (I/O) devices (e.g., touchscreens, displays, speakers, keyboards, mice, cameras, microphones, environmental sensors, etc.).

Each of the user VMs 130(1)-(N) hosted on the respective computing node includes at least one application and everything the user VM needs to execute (e.g., run) the at least one application (e.g., system binaries, libraries, etc.). Each of the user VMs 130(1)-(N) may generally be configured to execute any type and/or number of applications, such as those requested, specified, or desired by a user. Each of the user VMs 130(1)-(N) further includes a respective virtualized hardware stack (e.g., virtualized network adaptors, virtual local storage, virtual memory, processor units, etc.). To manage the respective virtualized hardware stack, each of the user VMs 130(1)-(N) is further configured to host a respective operating system (e.g., Windows®, Linux®, etc.). The respective virtualized hardware stack configured for each of the user VMs 130(1)-(N) may be defined based on available physical resources (e.g., processor units, the local memory 144(1)-(N), the local storage 106(1)-(N), etc.). That is, physical resources associated with a computing node may be divided between (e.g., shared among) components hosted on the computing node (e.g., the hypervisor 110(1)-(N), the CVM 122(1)-(N), other user VMs 130(1)-(N), the containers 132(1)-(N), etc.), and the respective virtualized hardware stack configured for each of the user VMs 130(1)-(N) may reflect the physical resources being allocated to the user VM. Thus, the user VMs 130(1)-(N) may isolate an execution environment my packaging both the user space (e.g., application(s), system binaries and libraries, etc.) and the kernel and/or hardware (e.g., managed by an operating system). While FIG. 1 depicts the computing nodes 104(1)-(N) each having multiple user VMs 130(1)-(N), a given computing node may host no user VMs or may host any number of user VMs.

Rather than providing hardware virtualization like the user VMs 130(1)-(N), the respective containers 132(1)-(N) may each provide operating system level virtualization. Thus, each of the respective containers 132(1)-(N) is configured to isolate the user space execution environment (e.g., at least one application and everything the container needs to execute (e.g., run) the at least one application (e.g., system binaries, libraries, etc.)) without requiring an operating system to manage hardware. Individual ones of the containers 132(1)-(N) may generally be provided to execute any type and/or number of applications, such as those requested, specified, or desired by a user. Two or more of the respective containers 132(1)-(N) may run on a shared operating system, such as an operating system of any of the hypervisor 110(1)-(N), the CVM 122(1)-(N), or other user VMs 130(1)-(N). In some examples, an interface engine may be installed to communicate between a container and an underlying operating system. While FIG. 1 depicts the computing nodes 104(1)-(N) each having multiple containers 132(1)-

(N), a given computing node may host no containers or may host any number of containers.

Each of the hypervisors 110(1)-(N) may include any type of hypervisor. For example, each of the hypervisors 110(1)-(N) may include an ESX, an ESX(i), a Hyper-V, a KVM, or any other type of hypervisor. Each of the hypervisors 110(1)-(N) may manage the allocation of physical resources (e.g., physical processor units, volatile memory, the storage 170) to respective hosted components (e.g., CVMs 122(1)-(N), respective user VMs 130(1)-(N), respective containers 132(1)-(N)) and performs various VM and/or container related operations, such as creating new VMs and/or containers, cloning existing VMs and/or containers, etc. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API. Collectively, the hypervisors 110(1)-(N) may all include a common hypervisor type, may all include different hypervisor types, or may include any combination of common and different hypervisor types.

The CVMs 122(1)-(N) may provide services for the respective hypervisors 110(1)-(N), the respective user VMs 130(1)-(N), and/or the respective containers 132(1)-(N) hosted on a respective computing node of the computing nodes 104(1)-(N). For example, each of the CVMs 122(1)-(N) may execute a variety of software and/or may serve the I/O operations for the respective hypervisor 110(1)-(N), the respective user VMs 130(1)-(N), and/or the respective containers 132(1)-(N) hosted on the respective computing node 104(1)-(N). The CVMs 122(1)-(N) may communicate with one another via the network 180. By linking the CVMs 122(1)-(N) together via the network 180, a distributed network (e.g., cluster, system, etc.) of the computing nodes 104(1)-(N) may be formed. In an example, the CVMs 122(1)-(N) linked together via the network 180 may form a distributed computing environment (e.g., a distributed virtualized file server) 120 configured to manage and virtualize the storage 170. In some examples, a SCSI controller, which may manage the PMem devices, NVMe devices, SSD devices 140(1)-(N) and/or the HDD devices 142(1)-(N) described herein, may be directly passed to the respective CVMs 122(1)-(N), such as by leveraging a VM-Direct Path. In the case of Hyper-V, the SSD devices 140(1)-(N) and/or the HDD devices 142(1)-(N) may be passed through to the respective CVMs 122(1)-(N).

The CVMs 122(1)-(N) may coordinate execution of respective services over the network 180, and the services running on the CVMs 122(1)-(N) may utilize the local memory 144(1)-(N) to support operations. The local memory 144(1)-(N) may be shared by components hosted on the respective computing node 104(1)-(N), and use of the respective local memory 144(1)-(N) may be controlled by the respective hypervisor 110(1)-(N). Moreover, multiple instances of the same service may be running throughout the distributed system 100. That is, the same services stack may be operating on more than one of the CVMs 122(1)-(N). For example, a first instance of a service may be running on the CVM 122(1), a second instance of the service may be running on the CVM 122(2), etc.

In some examples, the distributed computing system 100 may be configured to facilitate an integrated (e.g., intra-cluster or intra-computing node) network installation protocol for installing an operating system on a VM of the user VM(s) 130(1)-(N). The method leverages network boot and installation protocols (e.g., TFTP and/or PXE server boot protocols) to install an operating system on a virtual machine (VM) hosted on a computing node 104(1)-(N) of distributed computing system 100 without communicating over the network 180. The method may include hosting a respective DHCP server instance 123(1)-(N) and a respective network boot server instance 124(1)-(N) on one or more of the CVMs 122(1)-(N) to emulate DHCP protocol and network boot server protocol communications facilitate an OS installation. The network boot server instance 124(1)-(N) may be configured to perform a network boot and direct the user VM to access installation/boot files or images 171 hosted in a storage container of the storage 170. In addition, one or more VXLANs 114(1)-(N) and a virtual switch 112(1)-(N) may be hosted at a hypervisor running on the host machine. In some examples, the VXLANs 114(1)-(N) may be configured according to a communications protocol, such as an OpenFlow protocol.

The virtual switch of the virtual switches 112(1)-(N) hosted on the same computing node of the computing nodes 104(1)-(N) as the user VM sending the request may receive broadcast DHCP messages from a virtual network interface card (vNIC) of the user VM requesting network information (e.g., internet protocol (IP) address, network boot server information, etc.). In some examples, each of the virtual switches 112(1)-(N) may be configured with one or more OpenFlow rules that define routing criteria for certain network package types. The OpenFlow rules may direct the virtual switches 112(1)-(N) to route the DHCP communication packets to a first port associated with a first VXLAN and to route the network boot packet types to a second port associated with a second VXLAN. Thus, each of the virtual switches 112(1)-(N) may be configured with OpenFlow rules (e.g., packet matching rules) to route DHCP communication packets and network boot packets over respective VXLANs 114(1)-(N). Thus, in response to receipt of the DHCP broadcast request, the respective virtual switch 112(1)-(N) may route the DHCP broadcast message to a first port based on the predetermined OpenFlow rule corresponding to DHCP broadcast messages. In some examples, the virtual switches 112(1)-(N) or the vNIC of the user VM may be configured with a VM vNIC flag that directs the respective virtual switches 112(1)-(N) to re-direct communications from the user VM to the respective DHCP server instance 123(1)-(N) or to the respective network boot server instance 124(1)-(N) hosted on the CVM 122(1)-(N) of the same computing node, or to route requests over the physical network 180.

Based on the OpenFlow rules, the virtual switch 112(1)-(N) receiving the request may direct the request to the respective DHCP server instance 123(1)-(N) on the same computing node via the respective VXLAN 114(1)-(N) on the same computing node, rather than directing the request to an external DHCP server over the physical network 180. The respective DHCP server instance 123(1)-(N) may communicate with the user VM via the respective VXLAN 114(1)-(N) (e.g., via packet routing by the virtual switch based on the OpenFlow rules) to provide the network information.

In response to receipt of the network information, the user VM (using the vNIC) may transmit a network boot request to a network boot server using a network boot protocol. The network boot protocol may include a TFTP or a PXE boot protocol. The respective virtual switch 112(1)-(N) may direct the request to the respective network boot server instance 124(1)-(N) host on the same computing via a second VXLAN 114(1)-(N) of the same computing node based on the VM vNIC flag and/or based on the OpenFlow rules. In response to the request, the respective network boot server instance 124(1)-(N) may communicate with the user VM to facilitate a network boot operation. After the network boot operation is complete, the network boot server instance 124(1)-(N) may direct the user VM to the respective installation/boot files or images (e.g., including an operating system) 171 associated with the user VM based on information provided with the request. The installation/boot files or images 171 may include ISO files, or a server message block (SMB) or network file server (NFS) container whitelist to allow a network installation. The installation/boot files or images 171 may be stored on the network boot server instance 124(1)-(N) directory in a storage container of the storage 170. In communication with the user VM, the network boot server instance 124(1)-(N) may be configured to provide the installation/boot files or images 171 to the user VM.

Using a network installation protocol may reduce overhead associated with managing updates to installation files as compared with local installations that involve local installation via a portable storage medium (e.g., CD, DVD, flash drive, etc.) containing installation files, which discarded and replaced or reloaded with new installation files whenever the installation files are updated. However, because network installation protocols require connection via a network to retrieve the installation files, availability and speed are dependent on performance of the connected network. However, performing the network installation using virtual networks and server instances hosting locally may mitigate dependence on the physical network 180, while retaining the benefits of centrally maintaining installation files. That is, the network boot protocol may allow installation files to be loaded to a user VM 130(1)-(N) in a highly available and automated way by bypassing dependency on components external to the cluster of host machines and ensuring traffic stays local to the host by means of IP address management (IPAM), OpenFlow, and VXLAN architectures. The local communication solution may remove the dependency on external servers by the redirection of appropriate traffic types and gain performance because installation traffic is contained to a local host machine and is read only in nature. Use of the IPAM may prevent conflict with physically present DHCP/PXE server on the network. In addition, an ability to manage network installation using centralized storage may facilitate automated installations of many different operating systems.

Figure 2A:
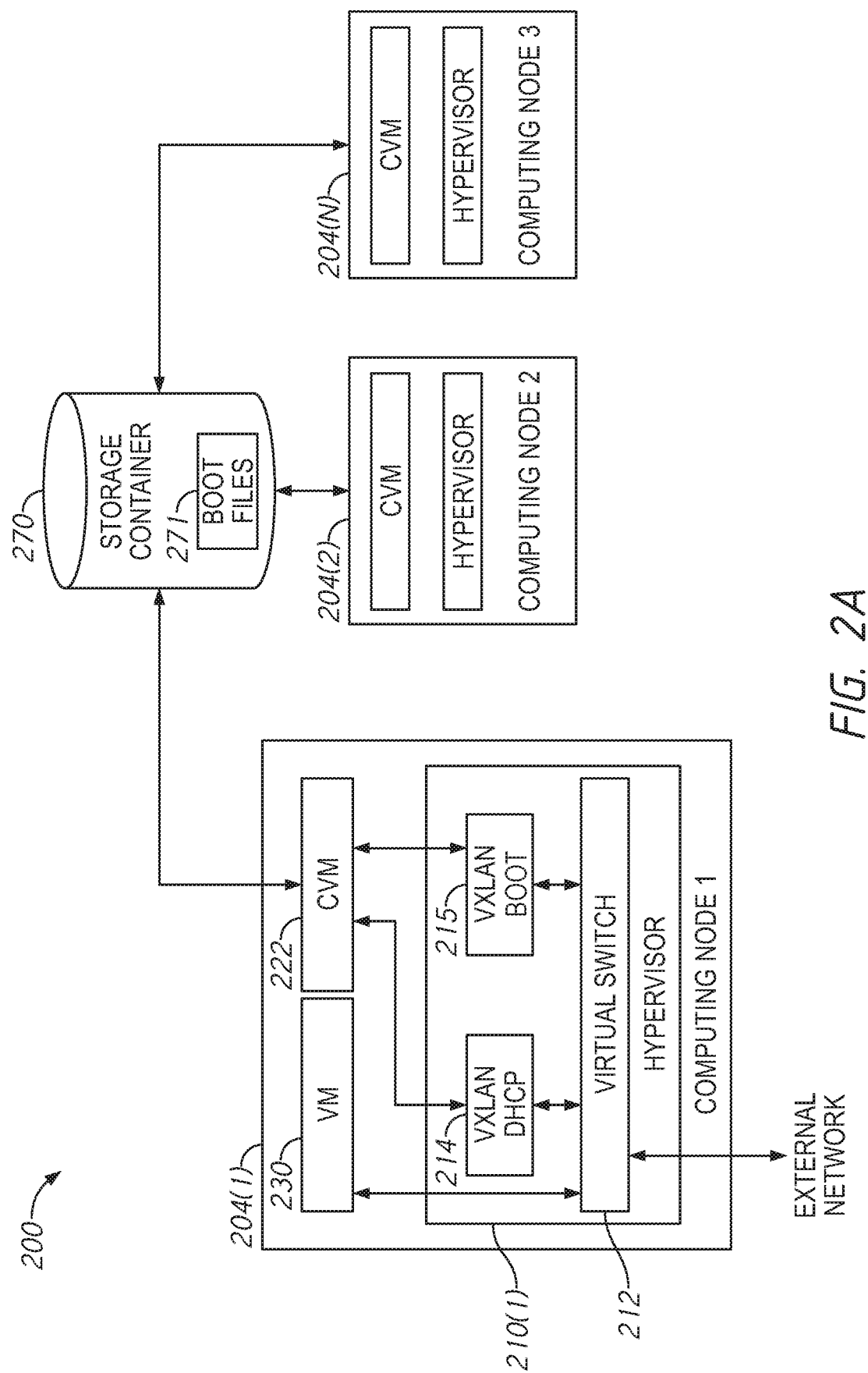
FIG. 2A depicts a block diagram of a distributed computing system 200 to perform an intra-host machine network boot and installation in accordance with embodiments of the disclosure.
Figure 2B:
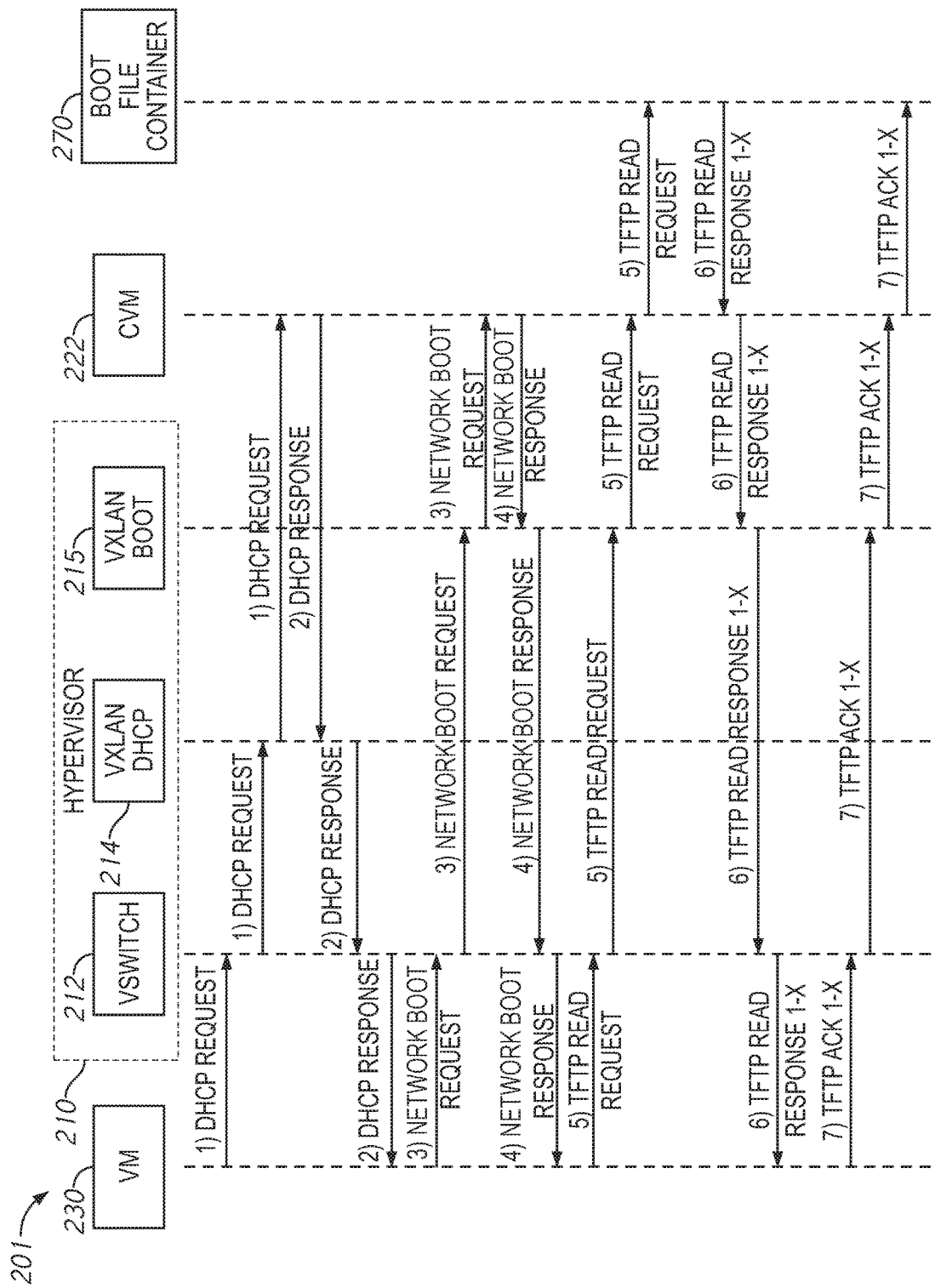
FIG. 2B depicts a sequence diagram of the system of FIG. 2A to show communications associated with an intra-host machine network boot and installation in accordance with embodiments of the disclosure.

FIG. 2A depicts a block diagram of a distributed computing system 200 to perform an intra-host machine network boot and installation in accordance with embodiments of the disclosure. FIG. 2B depicts a sequence diagram of the system 200 of FIG. 2A to show communications associated with an intra-host machine network boot and installation in accordance with embodiments of the disclosure. The distributed computing system 100 of FIG. 1 may implement the distributed computing system 200 and operations pertaining to the sequence diagram 201 of FIGS. 2A and 2B, respectively, in some examples.

With reference to FIGS. 2A and 2B, the system 200 generally includes computing nodes 204(1)-(N) each coupled to a storage container 270 containing installation/boot files or images 271. While FIG. 2A depicts three computing nodes, the system 200 may include one, two or more than three computing nodes without departing from the scope of the disclosure. The storage container 270 may include respective local storage for each of the computing nodes 204(1)-(N). In the interest of clarity and brevity, the following discussion with respect to operation of the system 200 is limited to boot operations associated with a user VM 230. It is appreciated that the system 200, and the computing nodes 204(1)-(N) therein, may be capable of performing additional operations beyond those described.

Each of the computing nodes 204(1)-(N) may include a computing device configured to host a respective hypervisor 210, a CVM 222, and a respective user (or guest) VM 230. Each of the computing nodes 204(1)-(N) may be or include a server computer, a laptop computer, a desktop computer, a tablet computer, a smart phone, any other type of computing device, or any combination thereof. Each of the computing nodes 204(1)-(N) may include one or more physical computing components, such as one or more processor units, and respective local memory.

The following description pertains to boot operation of the user VM 230 of the computing node 204(1). It is appreciated that computing nodes 204(2)-(N) may be configured host user VMs and may be configured to perform boot operations similar to the boot operations described with reference to the computing node 204(1). As such, in the interest of clarity and brevity, operation of the computing nodes 204(2)-(N) will not be repeated.

Generally, once operational, the user VM 230 includes at least one application and everything the user VM 230 needs to execute (e.g., run) the at least one application (e.g., system binaries, libraries, etc.). The user VM 230 may generally be configured to execute any type and/or number of applications, and may include a respective virtualized hardware stack (e.g., virtualized network adaptors, virtual local storage, virtual memory, processor units, etc.). To manage the respective virtualized hardware stack, the user VM 230 is further configured to host a respective operating system (e.g., Windows®, Linux®, etc.).

To load the operating system and any other boot images, the user VM 230 may initiate a boot operation as part of a startup process. As shown in the sequence diagram 201, to initiate the boot operation, the user VM 230 may (1) broadcast a DHCP request for network information via a virtual network interface card (vNIC). The network information may include a request for an IP address and network boot server information.

The (1) the broadcast DHCP request may be received by a virtual switch 212 of the hypervisor 210. In some examples, the virtual switch 212 may be configured with one or more OpenFlow rules that define routing criteria for certain network package types, such as boot request package types. The OpenFlow rules may direct the virtual switch 212 to route the DHCP communication packets to a first port associated with the VXLAN DHCP 214 and to route the network boot packet types to a second port associated with the VXLAN Boot 215. Thus, the virtual switch 212 may be configured with OpenFlow rules (e.g., packet matching rules) to route DHCP communication packets and network boot packets over respective VXLANs 214 and 215. In some examples, the virtual switch 212 or the vNIC may be configured with a VM vNIC flag that directs the virtual switch 212 to re-direct communications from the VM 230 to a DHCP server instance or to a network boot server instance hosted on the CVM 222, or to route requests over the physical network.

Accordingly, in response to receipt of (1) the broadcast DHCP request, the virtual switch 212 may direct the request to the DHCP server instance hosted on the CVM 222 via the VXLAN DHCP 214 based on the predetermined routing rules (e.g., predetermined OpenFlow rule corresponding to DHCP broadcast messages).

In response to receipt of (1) the broadcast DHCP request, the DHCP server instance hosted on the CVM 222 may (2) provide a DHCP response to the VM 230 via the VXLAN DHCP 214 and the virtual switch 212 that includes network information. The VM 230 may configure its vNIC according to the network information received in (2) the DHCP response.

Based on network boot server information received in the network information, the VM 230 may transmit (3) a network boot request to a network boot server using a network boot protocol. The network boot protocol may include a TFTP or a PXE boot protocol. The virtual switch 212 may direct (3) the network boot request to the network boot server instance hosted on the CVM 222 via the VXLAN boot 215 based on the predetermined routing rules. In response to (3) the network boot request, the network boot server instance may provide (4) a network boot response to the VM 230 via the VXLAN boot 215 and the virtual switch 212 to facilitate a network boot operation. In some examples, (4) the network boot response may include a location of the installation/boot files or images 271 stored in the storage container 270. The installation/boot files or images 271 may include installation/boot files or images (e.g., including an operating system) stored at the storage container 270, which may be associated with the VM 230 based on information provided with (3) the network boot request. The installation/boot files or images 271 may include ISO files, or a server message block (SMB) or network file server (NFS) container whitelist to allow a network installation. The installation/boot files or images 271 may be stored on the network boot server instance directory in the storage container 270.

After the network boot operation is complete, the VM 230 may provide (5) a TFTP read request directed to the network boot server instance hosted on the CVM 222 via the virtual switch 212 and the VXLAN boot 215 to provide the installation/boot files or images 271 stored at the storage container 270 to the VM 230.

In response to receipt of (5) the TFTP read request, the network boot server instance may begin provide (6) TFTP read response packets 1-X to the VM 230 via the VXLAN boot 215 and the virtual switch 212, which each include a portion of the installation/boot files or images 271. In response to successful receipt of each of (6) the TFTP read response packets 1-X, the VM 230 may provide (7) a corresponding TFTP acknowledgement ACK message packet 1-X to the network boot server instance hosted on the CVM 230 via the virtual switch 212 and the VXLAN boot 215. Once the VM 230 has received all X packets, the VM 230 may install the operating system and any other applications included in the installation/boot files or images 271 sent via (6) the TFTP read response packets 1-X.

Using a network installation protocol may reduce overhead associated with managing updates to installation files as compared with local installations that involve local installation via a portable storage medium (e.g., CD, DVD, flash drive, etc.) containing installation files, which discarded and replaced or reloaded with new installation files whenever the installation files are updated. However, because network installation protocols require connection via a network to retrieve the installation files, availability and speed are dependent on performance of the connected network. However, performing the network installation using virtual networks and server instances hosting locally may mitigate dependence on the physical network 180, while retaining the benefits of centrally maintaining installation files. That is, the network boot protocol may allow installation files to be loaded to a user in a highly available and automated way by bypassing dependency on components external to the cluster of host machines and ensuring traffic stays local to the host by means of IP address management (IPAM), OpenFlow, and VXLAN architectures. The local communication solution may remove the dependency on external servers by the redirection of appropriate traffic types and gain performance because installation traffic is contained to a local host machine and is read only in nature. Use of the IPAM may prevent conflict with physically present DHCP/PXE server on the network. In addition, an ability to manage network installation using centralized storage may facilitate automated installations of many different operating systems.

Figure 3:
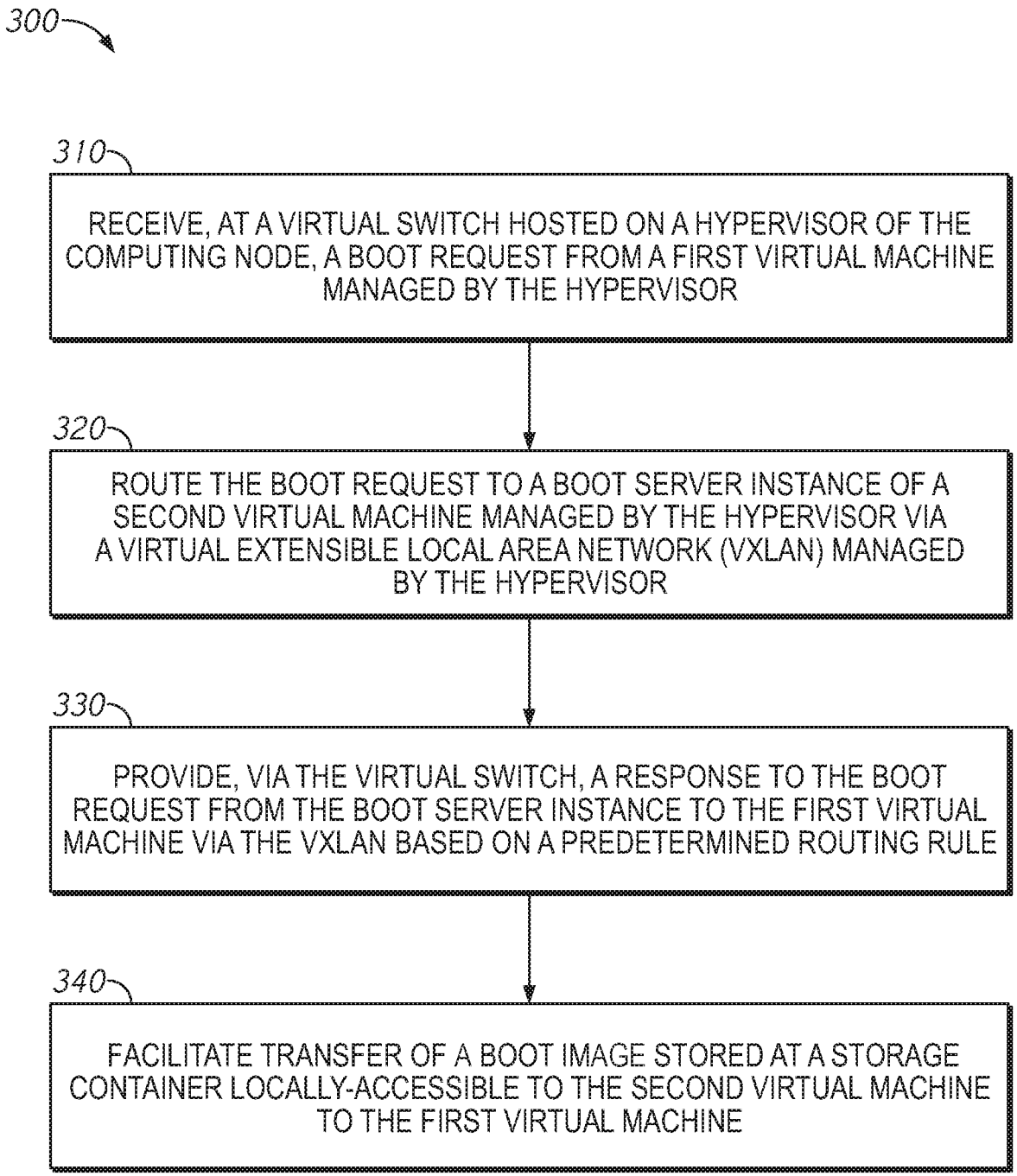
FIG. 3 depicts a flow diagram of a method to perform an intra-host machine network boot and installation in accordance with embodiments of the disclosure.

FIG. 3 depicts a flow diagram of a method to perform an intra-host machine network boot and installation in accordance with embodiments of the disclosure. The method 300 may be performed by any of the computing nodes 104(1)-(N) of FIG. 1 and/or any of the computing nodes 204(1)-N of FIG. 2A.

The method 300 may include receiving, at a virtual switch hosted on a hypervisor of the computing node, a boot request from a first virtual machine managed by the hypervisor, at 310. The virtual switch may include any of the virtual switches 112(1)-(N) of FIG. 1 and/or the virtual switch 212 of FIGS. 2A and 2B. The hypervisor may include any of the hypervisors 110(1)-(N) of FIG. 1 and/or the hypervisor 210 of FIG. 2. The first virtual machine may include any user VM of the user VMs 130(1)-(N) of FIG. 1 and/or the VM 230 of FIGS. 2A and 2B. In some examples, the method may include providing a preboot execution environment boot request from the first virtual machine as the boot request.

The method 300 may further include routing the boot request to a boot server instance of a second virtual machine managed by the hypervisor via a virtual extensible local area network (VXLAN) managed by the hypervisor, at 320. The second virtual machine may include any of the CVMs 122(1)-(N) of FIG. 1 and/or the CVM 222 of FIGS. 2A and 2B. The boot server instance may include any of the boot server instances 124(1)-(N) of FIG. 1 and/or the boot server instance hosted on the CVM 222 of FIGS. 2A and 2B. The VXLAN may include any of the VXLANs 114(1)-(N) of FIG. 1 and/or the VXLAN boot 215 of FIGS. 2A and 2B. In some examples, the method 300 may further include routing the boot request to the boot server via the VXLAN based on a flag associated with the first virtual machine. In some examples, the method 300 may further include routing the boot request to the boot server via the VXLAN based on a communication protocol associated with the VXLAN.

In some examples, the method 300 may include facilitating exchange of network information between the first virtual machine and a dynamic host configuration protocol (DHCP) server instance hosted on the second virtual machine via a second VXLAN prior to receipt of the boot request. The DHCP server instance may include any of the DHCP server instances 123(1)-(N) of FIG. 1 and/or the DHCP server instance hosted on the CVM 222 of FIGS. 2A and 2B. The second VXLAN may include any of the VXLANs 114(1)-(N) of FIG. 1 and/or the VXLAN DHCP 214 of FIGS. 2A and 2B.

The method 300 may further include providing, via the virtual switch, a response to the boot request from the boot server instance to the first virtual machine via the VXLAN based on a predetermined routing rule, at 330. The predetermined routing rule may include an OpenFlow routing rule programmed in the virtual switch, in some examples. In some examples, the method 300 may further include providing the response to the boot request from the boot server instance to the first virtual machine via the VXLAN based on an OpenFlow rule corresponding to the boot request.

The method 300 may further include facilitating transfer of a boot image stored at a storage container locally-accessible to the second virtual machine to the first virtual machine, at 340. The storage container may include a storage container of the storage 170 of FIG. 1 and/or the storage container 270 of FIG. 2A. The boot image may include the installation/boot files or images 171 of FIG. 1 and/or the installation/boot files or images 271 of FIG. 2A. In some examples, the method 300 may further include facilitating transfer of boot files to the first virtual machine using a trivial file transfer protocol.

The method 300 may be implemented as instructions stored on a computer readable medium (e.g., memory, disks, etc.) that are executable by one or more processor units (e.g., central processor units (CPUs), graphic processor units (GPUs), tensor processing units (TPUs), hardware accelerators, video processing units (VPUs), etc.) to perform the method 300.

Figure 4:
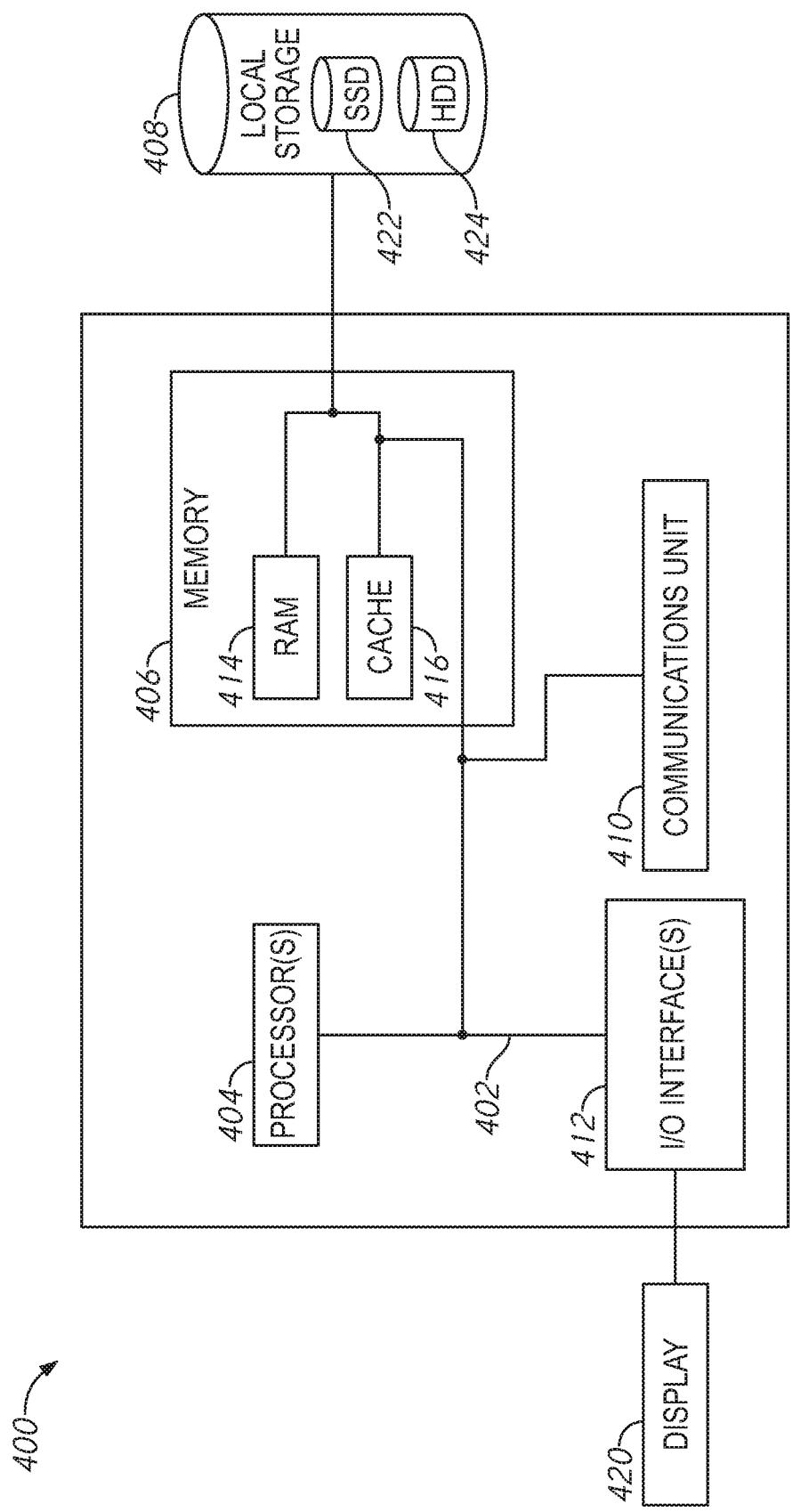
FIG. 4 is a block diagram of components of a computing node in accordance with an embodiment of the present disclosure.

FIG. 4 depicts a block diagram of components of a computing node (device) 400 in accordance with an embodiment of the present disclosure. It should be appreciated that FIG. 4 provides only an illustration of one implementation and does not imply any limitations with regard to the environments in which different embodiments may be implemented. Many modifications to the depicted environment may be made. The device 400 may implemented as at least part of any of the computing nodes 104(1)-(N) of FIG. 1, any of the computing nodes 204(1)-(N) of FIG. 2A, or any combination thereof. In addition, the computing node 400 may be configured to store perform the operations described with reference to the sequence diagram of FIG. 2B and/or the method 300 described with reference to FIG. 3.

The device 400 includes a communications fabric 402, which provides communications between one or more processor(s) 404, memory 406, local storage 408, communications unit 410, I/O interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses.

The memory 406 and the local storage 408 are computer-readable storage media. In this embodiment, the memory 406 includes random access memory RAM 414 and cache 416. In general, the memory 406 can include any suitable volatile or non-volatile computer-readable storage media. The local storage 408 may be implemented as described above with respect to local storage 144(1)-(N) of FIG. 1. In this embodiment, the local storage 408 includes an SSD 422 and an HDD 424, which may be implemented as described above with respect to any of SSD 140(1)-(N) and any of HDD 142(1)-(N) of FIG. 1, respectively.

Various computer instructions, programs, files, images, etc. may be stored in local storage 408 for execution by one or more of the respective processor(s) 404 via one or more memories of memory 406. In some examples, local storage 408 includes a magnetic HDD 424. For example, the local storage 406 may store executable instructions that, when executed, cause the one or more processors 404 to perform operations described with reference to FIGS. 1-3, including operations corresponding to the sequence diagram 201 of FIG. 2B and or the method 300 of FIG. 3. Alternatively, or in addition to a magnetic hard disk drive, local storage 408 can include the SSD 422, a semiconductor storage device, a read-only memory (ROM), an erasable programmable read-only memory (EPROM), a flash memory, or any other computer-readable storage media that is capable of storing program instructions or digital information.

The media used by local storage 408 may also be removable. For example, a removable hard drive may be used for local storage 408. Other examples include optical and magnetic disks, thumb drives, and smart cards that are inserted into a drive for transfer onto another computer-readable storage medium that is also part of local storage 408.

Communications unit 410, in these examples, provides for communications with other data processing systems or devices. In these examples, communications unit 410 includes one or more network interface cards. Communications unit 410 may provide communications through the use of either or both physical and wireless communications links.

I/O interface(s) 412 allows for input and output of data with other devices that may be connected to device 400. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 408 via I/O interface(s) 412. I/O interface(s) 412 also connect to a display 420.

Display 420 provides a mechanism to display data to a user and may be, for example, a computer monitor.

The illustrative embodiments described in this detailed description and claims are not meant to be limiting. Other embodiments may be utilized, and other changes may be made, without departing from the spirit or scope of the subject matter presented here.

Various embodiments of the invention will now be described. The following description provides specific details for a thorough understanding and enabling description of these examples. One skilled in the relevant art will understand, however, that embodiments of the invention may be practiced without many of these details. Likewise, one skilled in the relevant art will also understand that embodiments incorporate many other obvious features not described in detail herein. Additionally, some well-known structures or functions may not be shown or described in detail below, so as to avoid unnecessarily obscuring the relevant description.

The terminology used herein is to be interpreted in its broadest reasonable manner, even though it is being used in conjunction with a detailed description of certain specific examples of the invention. Indeed, certain terms may even be emphasized below; any terminology intended to be interpreted in any restricted manner will, however, be overtly and specifically defined as such in this Description section.

What is claimed is:

1. At least one non-transitory computer readable medium encoded with executable instructions that, when executed by a processor, cause a computing node to perform operations comprising:

receiving, at a virtual switch hosted on a hypervisor of the computing node, a boot request from a first virtual machine managed by the hypervisor;

routing the boot request to a boot server instance of a second virtual machine managed by the hypervisor via a virtual extensible local area network (VXLAN) managed by the hypervisor;

providing, via the virtual switch, a response to the boot request from the boot server instance to the first virtual machine via the VXLAN based on a predetermined routing rule; and facilitating transfer of a boot image stored at a storage container locally-accessible to the second virtual machine to the first virtual machine.

2. The at least one non-transitory computer readable medium of claim 1, wherein the instructions further cause the computing node to perform operations comprising facilitating exchange of network information between the first virtual machine and a dynamic host configuration protocol (DHCP) server instance hosted on the second virtual machine via a second VXLAN prior to receipt of the boot request.

3. The at least one non-transitory computer readable medium of claim 1, wherein the instructions further cause the computing node to perform operations comprising providing a preboot execution environment boot request from the first virtual machine as the boot request.

4. The at least one non-transitory computer readable medium of claim 1, wherein the instructions further cause the computing node to perform operations comprising facilitating transfer of the boot image to the first virtual machine using a trivial file transfer protocol.

5. The at least one non-transitory computer readable medium of claim 1, wherein the instructions further cause the computing node to perform operations comprising routing the boot request to the boot server via the VXLAN based on a flag associated with the first virtual machine.

6. The at least one non-transitory computer readable medium of claim 1, wherein the instructions further cause the computing node to perform operations comprising routing the boot request to the boot server via the VXLAN based on a communication protocol associated with the VXLAN.

7. The at least one non-transitory computer readable medium of claim 1, wherein the instructions further cause the computing node to perform operations comprising providing the response to the boot request from the boot server instance to the first virtual machine via the VXLAN based on an OpenFlow rule corresponding to the boot request.

8. A computing node, comprising:
a user virtual machine (VM) configured to, during a boot operation, provide a boot request directed to a boot server instance, wherein the user VM is configured to initiate transfer of a boot image to the user VM in response to receipt of a boot response and to install the boot image upon receipt;

a controller VM configured to host the boot server instance, wherein the boot server instance is configured to provide a boot response in response to the boot request, wherein the boot server instance VM is configured to transfer the boot image to the user VM;

a hypervisor comprising a virtual switch, wherein the hypervisor is configured to manage a virtual extensible local area network (VXLAN), the user VM, and the controller VM, wherein the virtual switch is configured to route the boot request, the boot response, and transfer of the boot image over the VXLAN according to a routing rule.

9. The computing node of claim 8, wherein the controller VM is further configured to host a dynamic host configuration protocol (DHCP) server instance configured to provide a DHCP response including network information to the user VM in response to a DHCP request received from the user VM.

10. The computing node of claim 9, wherein the hypervisor is further configured to route a second VXLAN the DHCP request and the DHCP response between the user VM and the controller VM according to a second routing rule.

11. The computing node of claim 9, wherein the user VM is configured to direct the boot request to the boot server instance based on an address of the boot server instance retrieved from the network information.

12. The computing node of claim 8, wherein the user VM is configured to provide a preboot execution environment boot request as the boot request.

13. The computing node of claim 8, wherein the controller VM is configured to transfer the boot image to the user VM using a trivial file transfer protocol.

14. The computing node of claim 8, wherein the virtual switch is configured to route the boot request to the boot server instance via the VXLAN based on a flag associated with the user VM.

15. The computing node of claim 8, wherein the virtual switch is configured to route the boot request to the boot server via the VXLAN based on a communication protocol associated with the VXLAN.

16. The computing node of claim 8, wherein the virtual switch is configured to route the boot request to the controller VM via the VXLAN based on an OpenFlow rule.

17. A method, comprising:
receiving, at a virtual switch hosted on a hypervisor of a computing node, a boot request from a first virtual machine managed by the hypervisor;

routing the boot request to a boot server instance of a second virtual machine managed by the hypervisor via a virtual extensible local area network (VXLAN) managed by the hypervisor;

providing, via the virtual switch, a response to the boot request from the boot server instance to the first virtual machine via the VXLAN based on a predetermined routing rule; and facilitating transfer of a boot image stored at a storage container locally-accessible to the second virtual machine to the first virtual machine.

18. The method of claim 17, further comprising facilitating exchange of network information between the first virtual machine and a dynamic host configuration protocol (DHCP) server instance hosted on the second virtual machine via a second VXLAN prior to receipt of the boot request.

19. The method of claim 17, further comprising providing a preboot execution environment boot request from the first virtual machine as the boot request.

20. The method of claim 17, further comprising facilitating transfer of the boot image to the first virtual machine using a trivial file transfer protocol.

21. The method of claim 17, further comprising routing the boot request to the boot server via the VXLAN based on a flag associated with the first virtual machine.

22. The method of claim 17, further comprising routing the boot request to the boot server via the VXLAN based on a communication protocol associated with the VXLAN.

23. The method of claim 17, further comprising providing the response to the boot request from the boot server instance to the first virtual machine via the VXLAN based on an OpenFlow rule corresponding to the boot request.

\* \* \* \* \*